United States Patent
Herz et al.

[15] 3,681,347
[45] Aug. 1, 1972

[54] BASIC OXAZINE DYESTUFFS

[72] Inventors: Luis Herz; Reinhard Mohr, both of Offenbach, Main; Eberhard Mundlos, Heusenstamm; Johann Ostermeier, Rembrucken, all of Germany

[73] Assignee: Farbwerke Hoechst Aktiengesellschaft vormals Meister Lucius & Bruning, Frankfurt, Main, Germany

[22] Filed: April 15, 1970

[21] Appl. No.: 28,965

[30] Foreign Application Priority Data
April 17, 1969 Germany............P 19 19 511.0

[52] U.S. Cl..........................260/242, 8/54, 8/54.2, 8/62, 8/162 R, 8/168, 8/177 AB, 8/178 R, 8/180, 260/244 R
[51] Int. Cl.............................................C07d 87/50
[58] Field of Search.................................260/244 R

[56] References Cited

UNITED STATES PATENTS 2,741,605   4/1956   Zwilgmeyer...............260/244 R

FOREIGN PATENTS OR APPLICATIONS 530,722   9/1956   Canada.....................260/244 R
1,533,638   6/1968   France......................260/244 R
124,431   9/1967   Czechoslovakia.........260/244 R OTHER PUBLICATIONS
Wallace et al., Def. Pub. Search Copy of Serial No. 717,416, filed Mar. 29, 1968, published in 856 OG 1021, on Nov. 26, 1968, Defensive Publication No. 856,047.

*Primary Examiner*—Natalie Trousof
*Attorney*—Connolly and Hutz

[57] ABSTRACT

Basic oxazine dyestuffs having the formula

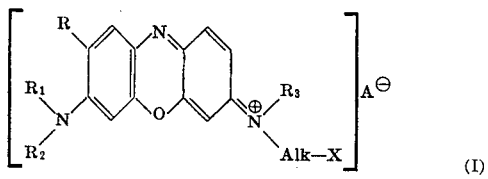

wherein R represents an alkyl group, $R_1$, $R_2$ and $R_3$ each represent an alkyl group which may contain further substituents and $R_1$ and $R_2$ taken with one another and together with the nitrogen atom to which they are attached may form a heterocyclic ring, Alk represents an alkylene radical, X stands for a halogen atom or a cyano, trifluoromethyl, acyl or carboxylic acid ester group, or a carboxylic acid amide group which may be substituted, or an alkylsulfone or arylsulfone group, or a sulfonic acid amide group which may be substituted, or an acyloxy, acylamino, sulfonylamino, carbamic acid ester urea, or dicarboximido group, and $A^-$ represents an anion.

6 Claims, No Drawings

BASIC OXAZINE DYESTUFFS

The present invention relates to basic oxazine dyestuffs which correspond to the general formula

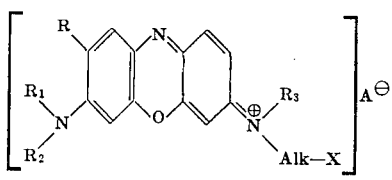

wherein R stands for an alkyl group preferably containing one to four carbon atoms, $R_1$, $R_2$ and $R_3$ each represent a lower alkyl group which may contain further substituents and $R_1$ and $R_2$ taken with one another and together with the nitrogen atom to which they are attached may form a heterocyclic, preferably a saturated and more especially a 6-membered ring, Alk stands for an alkylene radical preferably containing one to four carbon atoms, X stands for a halogen atom or a cyano, trifluoromethyl, acyl or carboxylic acid ester group, or a carboxylic acid amide group which may be substituted, or an alkylsulfone or arylsulfone group, or a sulfonic acid amide group which may be substituted, or an acyloxy, acylamino, sulfonylamino, carbamic acid ester, urea or dicarboximido group, and A is an anion.

Moreover, this invention provides a process for the preparation of said dyestuffs.

The dyestuffs of the invention can be prepared by condensing a compound of the general formula

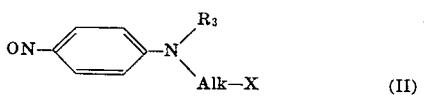

in which $R_3$, Alk and X are defined as above, with an aminophenol of the general formula III

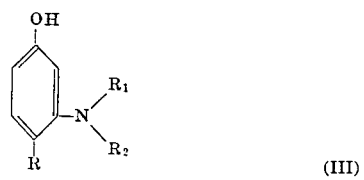

in which $R_1$, $R_2$ and R have the meanings given above, in an acid medium.

The nitroso compounds of the formula II used in the instant process can be obtained by introducing the nitroso group, in known manner, into an N-(X-alkylene)-N-alkyl-aniline using, for example, an alkali metal nitrite and mineral acids. Suitable anilines of this type are, for instance: N-(X-alkylene)-N-methyl-, -N-ethyl-, -N-propyl- or -N-butylaniline, or N-(X-alkylene)-N-alkylanilines which may contain in in their alkyl radical $R_3$ further substituents such as halogen atoms, hydroxy, alkoxy, aryloxy, acyloxy, cyano, carbamyl, dialkylamino, carbalkoxy, acylamino or aryl radicals.

As compounds of the general Formula III there may be employed m-dialkylamino-p-alkylphenols, such as m-dimethylamino-, m-diethylamino-, m-dipropylamino-, m-dibutylamino-p-methyl-, -p-ethyl-, -p-propyl- or -p-butylphenols in which the alkyl radicals of the dialkylamino group may additionally contain substituents, for example, halogen atoms, hydroxy, alkoxy or cyano groups.

Moreover, those m-dialkylamino-p-alkyl-phenols are suitable in which the alkyl radical of the dialkylamino group together with the nitrogen atom forms a heterocyclic ring such, for example as M-(4-morpholyl)- or m-(1-piperidyl)-p-alkyl-phenols.

The condensation of the p-nitroso compounds with the m-dialkylamino-p-alkylphenols is carried out at temperatures between about 20° C. and about 120° C., preferably in the range of from about 60° C. to about 100° C., in an acidic medium. The p-nitroso starting compounds of Formula II are expediently used as hydrohalides, preferably as hydrochlorides and the condensation is conducted in the presence of an organic acid, for example of formic or acetic acid.

The dyestuffs obtained by the process of the present invention contain, as anion $A^\ominus$, the radical of a strong acid, preferably of sulfuric acid or hydrochloric acid, or a complex zinc chloride radical. These anions, introduced according to the invention, may also be replaced by anions of other acids, for example, of phosphoric acid, acetic acid, oxalic acid, benzene-sulfonic acid, toluene-sulfonic acid, aminosulfonic acid, nitric acid, carbonic acid, lactic acid or tartaric acid.

The new dyestuffs are suitable for dyeing or printing tannin-treated cellulose fibers, silk, leathers, or fully synthetic fibers such as acetate rayon, polyamide or acid-modified polyester fibers and, more especially, fibers containing polyacrylonitrile or polyvinylidene cyanide. The dyeings produced on said fibers are in most cases very clear and of intense tinctorial strength and have generally good fastness to light and to wet processing, for example to washing, fulling, cross-dyeing, carbonizing, chlorinating and perspiration, and good fastness to decatizing, steaming, ironing, rubbing and solvents. In general, the dyestuffs are substantially insensitive towards variations of the pH value of the dyebath and can thus be applied both from a weakly acidic and a strongly acidic bath. Moreover, they are stable at temperatures above 100° C., such as are used in high-temperature dyeing.

In comparison with dyestuffs of most closely related structure such as disclosed in U.S. Pat. No. 2,741,605 the new dyestuffs are distinguished by a better fastness to light in dyeings on polyacrylonitrile fibres.

The following Examples serve to illustrate the invention. The parts and percentages are by weight unless otherwise stated.

EXAMPLE 1

16.5 parts (0.1 mol) of 3-N-ethyl-N-methylamino-4-methylphenol were dissolved in 100 parts by volume of a 20 percent acetic acid, then 36 parts (0.15 mol) of 4-nitrose-N-ethyl-N-β-cyanoethyl-aniline-hydrochloride were added thereto, whereupon the pH value of the mixture was adjusted to 3 by means of concentrated hydrochloric acid and the batch was heated on the steam bath. The solution whose color, after a short heating time, turned to a deep blue was poured onto a mixture of 200 parts of ice, 400 parts of water, 5 parts of kieselguhr and 100 parts of sodium chloride. After filtration of the reaction mixture the dyestuff of the formula

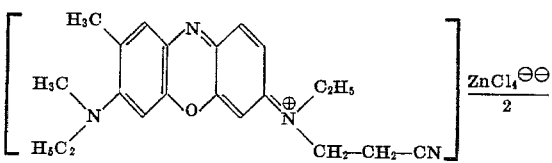

was precipitated from the filtrate by adding zinc chloride and sodium chloride, it was suction-filtered and dried. 36.5 parts of a dark powder were obtained which dissolved in water and dilute acids giving a blue solution.

1 g of said dyestuff was mixed by stirring with 2.5 g of acetic acid having 50% strength and dissolved in 6 l of water. Furthermore, 1 g of crystalline sodium acetate and 10 g of calcined sodium sulfate were added to the dyebath. Then 100 g of a pre-washed yarn made from polyacrylonitrile staple fibers were introduced into the dyebath heated to a temperature of 60° C., the temperature was slowly raised to 100° C., and the yarn was dyed for 1 hour at the boil. Subsequently, the bath was allowed to cool slowly to about 60° C. The yarn dyed in this manner was rinsed and dried. A clear, greenish blue dyeing was obtained exhibiting very good fastness to light and to wet processing.

EXAMPLE 2

15.1 parts (0.1 mol) of 3-N,N-dimethylamino-4-methyl-phenol were dissolved in 100 parts by volume of a 40 percent acetic acid, then 41.5 parts (0.15 mol) of 4-nitroso-N-butyl-Nβ-chloroethyl-aniline-hydrochloride were added thereto and the pH value of the mixture was adjusted to 3 by means of concentrated hydrochloric acid. After the bath had been heated for a short time on the steam bath, the color of the deep green solution turned to blue. Then, this solution was poured onto a mixture of 200 parts of ice, 400 parts of water, 5 parts of kieselguhr and 50 parts of sodium chloride, the whole was suction-filtered after a short stirring. From the filtrate, the dyestuff of the formula

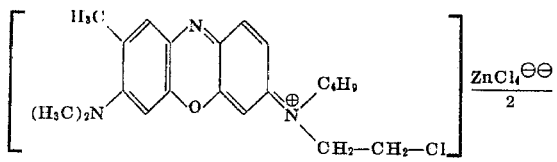

was precipitated by adding zinc chloride and sodium chloride, it was suction-filtered and dried. 30 parts of a dark powder were obtained which dissolved in water and dilute acids giving a blue color solution.

20 g of said dyestuff were dissolved hot together with 50 g of ββ'-dihydroxy-diethyl Sulfide, 30 g of cyclohexanol, 50 g of a 30 percent acetic acid and 400 g of water, and the whole was introduced with stirring into 450 g of a crystal gum thickener having a ratio of 1:2. Using this printing paste a fabric of polyacrylonitrile staple fibers was printed. The so-obtained print was dried, steamed for 30 minutes at 0.5 atmospheres gauge pressure, soaped at 50° C. with a liquor containing 1 g of a condensation product of oleic acid and methyl-taurine per liter of water and completed as usual. A well-fixed, greenish blue print was obtained which showed very good fastness to wet processing and to light.

EXAMPLE 3

15.1 parts (0.1 mol) of 3-dimethylamino-4-methyl-phenol were dissolved in 100 parts by volume of a 20 percent acetic acid, then 36 parts (0.15 mol) of 4-nitroso-N-ethyl-N-β-cyanoethylaniline-hydrochloride were added thereto, the pH value of the mixture was adjusted to 3 by means of concentrated hydrochloric acid and the batch heated on the steam bath. The solution whose color, after a short heating time, turned to a deep blue, as poured onto a mixture of 200 parts of ice, 400 parts of water, 5 parts of kieselguhr and 100 parts of sodium chloride. After filtration of the reaction mixture, the dyestuff of the formula

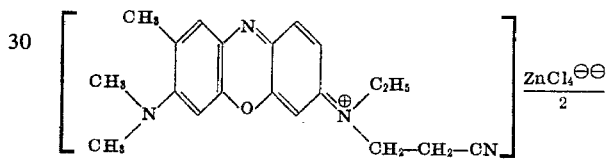

was precipitated from the filtrate by adding zinc chloride and sodium chloride, it was suction-filtered and dried. 36 parts of a dark powder were obtained which dissolved in water and dilute acids giving a blue solution.

1 g of said dyestuff was mixed by stirring with 2 g of a 50 percent acetic acid and dissolved in 5 l of water containing 1 g of crystalline sodium acetate. Then 100 g of a pre-washed textile material made form acid-modified polyester fibers were introduced into the dyebath heated to a temperature of 60° C., the temperature was slowly raised and the goods were dyed for 1 hour at 115° to 120° C. Subsequently, the bath was allowed to cool to about 70° C. and the dyeing was rinsed and dried. A clear blue dyeing exhibiting good fastness to light and to wet processing was obtained.

The following Table lists further dyestuffs being obtainable according to the invention, and the shades produced with said dyestuffs on polyacrylonitrile fibers.

| Alk-X | R | $R_1$ | $R_2$ | $R_3$ | $A^\ominus$ | Shade |
|---|---|---|---|---|---|---|
| $CH_2CH_2CN$ | $CH_3$ | $CH_3$ | $CH_3$ | $CH_3$ | $ZnCl_4/2$ | Greenish blue. |
| $CH_2CH_2CN$ | $CH_3$ | $CH_3$ | $CH_3$ | $C_4H_9$ | $ZnCl_4/2$ | Do. |
| $CH_2CH_2CN$ | $CH_3$ | $CH_3$ | $C_2H_5$ | $C_4H_9$ | $ZnCl_4/2$ | Do. |
| $CH_2CH_2CN$ | $C_2H_5$ | $CH_3$ | $CH_3$ | $C_4H_9$ | $ZnCl_4/2$ | Do. |
| $CH_2CH_2CN$ | $CH_3$ | $CH_3$ | $CH_3$ | $CH_2CH_2CN$ | $ZnCl_4/2$ | Do. |
| $CH_2CH_2CN$ | $CH_3$ | $CH_3$ | $CH_3$ | $CH_2CH_2OH$ | $ZnCl_4/2$ | Do. |
| $CH_2CH_2CN$ | $CH_3$ | $CH_3$ | $CH_3$ | $CH_2CH_2OCOCH_3$ | $ZnCl_4/2$ | Do. |
| $CH_2CH_2Cl$ | $CH_3$ | $CH_3$ | $CH_3$ | $CH_3$ | $ZnCl_4/2$ | Do. |
| $CH_2CH_2Cl$ | $CH_3$ | $CH_3$ | $CH_3$ | $C_2H_5$ | $ZnCl_4/2$ | Do. |
| $CH_2CH_2Cl$ | $CH_3$ | $CH_3$ | $CH_3$ | $CH_2CH_2Cl$ | $ZnCl_4/2$ | Do. |
| $CH_2CH_2Br$ | $CH_3$ | $CH_3$ | $CH_3$ | $CH_3$ | $ZnCl_4/2$ | Do. |
| $CH_2CH_2OCOCH_3$ | $CH_3$ | $CH_3$ | $CH_3$ | $CH_3$ | $ZnCl_4/2$ | Do. |
| $CH_2CH_2OCOCH_2Cl$ | $CH_3$ | $CH_3$ | $CH_3$ | $CH_3$ | $ZnCl_4/2$ | Do. |
| $CH_2CH_2OCOC_6H_5$ | $CH_3$ | $CH_3$ | $CH_3$ | $CH_3$ | $ZnCl_4/2$ | Do. |
| $CH_2CH_2OCOC_6H_4OCH_3$-4 | $CH_3$ | $CH_3$ | $CH_3$ | $CH_3$ | $ZnCl_4/2$ | Do. |
| $CH_2CH_2OCOC_6H_4CH_3$-4 | $CH_3$ | $CH_3$ | $CH_3$ | $CH_3$ | $ZnCl_4/2$ | Do. |
| $CH_2CH_2NHSO_2CH_3$ | $CH_3$ | $CH_3$ | $CH_3$ | $CH_3$ | $ZnCl_4/2$ | Do. |

| Alk-X | R | R₁ | R₂ | R₃ | A⊖ | Shade |
|---|---|---|---|---|---|---|
| CH₂—CH₂—N(CO)₂C₆H₄ (phthalimide) | CH₃ | CH₃ | CH₃ | CH₃ | ZnCl₄/2 | Do. |
| CH₂CH₂CONH₂ | CH₃ | CH₃ | CH₃ | CH₃ | ZnCl₄/2 | Do. |
| CH₂CH₂NHCOCH₃ | CH₃ | CH₃ | CH₃ | CH₃ | ZnCl₄/2 | Do. |
| CH₂CH₂COCH₃ | CH₃ | CH₃ | CH₃ | CH₃ | ZnCl₄/2 | Do. |
| CH₂CH₂COOCH₃ | CH₃ | CH₃ | CH₃ | CH₃ | ZnCl₄/2 | Do. |
| —CH₂CH₂CN | C₃H₇ | CH₃ | CH₃ | C₂H₅ | ZnCl₄⊖⊖/2 | Do. |
| —CH₂CH₂CN | C₃H₇ | CH₃ | C₂H₅ | C₂H₅ | Cl⊖ | Do. |
| —CH₂CH₂CN | C₃H₇ | CH₃ | C₄H₉ | C₂H₅ | Cl⊖ | Do. |
| —CH₂CH₂CN | C₄H₉ | CH₃ | CH₃ | C₂H₅ | Cl⊖ | Do. |
| —CH₂CH₂CN | C₄H₉ | CH₃ | C₃H₇ | C₂H₅ | Cl⊖ | Do. |
| —CH₂CH₂CN | CH₃ | C₂H₅ | C₂H₅ | C₂H₅ | HSO₄⊖ | Do. |
| —CH₂CH₂SO₂CH=CH₂ | CH₃ | CH₃ | CH₃ | C₂H₅ | ZnCl₄⊖⊖/2 | Do. |
| —CH₂CH₂SO₂CH=CH₂ | CH₃ | CH₃ | C₂H₅ | C₂H₅ | ZnCl₄⊖⊖/2 | Do. |
| —CH₂CH₂SO₂CH₂CH₂NHC₆H₅ | CH₃ | CH₃ | CH₃ | C₂H₅ | ZnCl₄⊖⊖/2 | Do. |
| —CH₂CH₂SO₂CH₂CH₂NHC₆H₅ | CH₃ | CH₃ | C₂H₅ | C₂H₅ | ZnCl₄⊖⊖/2 | Do. |
| —CH₂CH₂SO₂CH₂CH₂SC₆H₅ | CH₃ | CH₃ | C₂H₅ | C₂H₅ | H₃PO₄⊖ | Do. |
| —CH₂CH₂N(CO—CH₂)₂ (succinimide) | CH₃ | CH₃ | CH₃ | C₂H₅ | H₃PO₄⊖ | Do. |

We claim:
1. A basic oxazine dyestuff of the formula

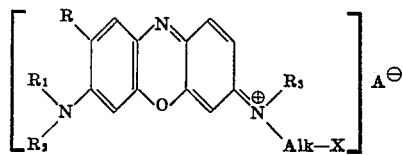

wherein R, R₁ and R₂ represent alkyl of one to four carbon atoms, R₃ represents alkyl, hydroxyalkyl, chloroalkyl or acetoxyalkyl each alkyl of which is of one to four carbon atoms, Alk represents alkylene of one to four carbon atoms, X represents chlorine, bromine, cyano, carboxamide or phthalimide, and A⊖ stands for the anion of an inorganic or organic acid or a zinc chloride complex compound.

2. The compound of the formula

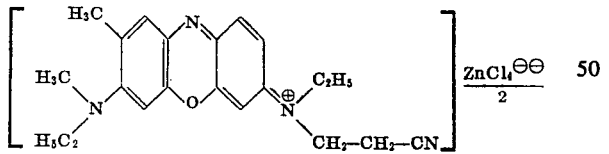

3. The compound of the formula

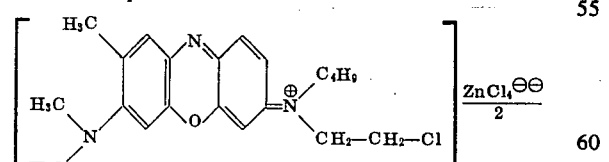

4. The compound of the formula

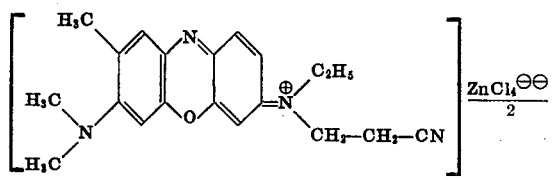

5. The compound of the formula

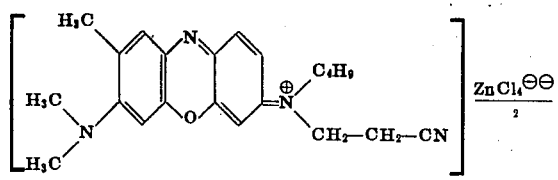

6. The compound of the formula

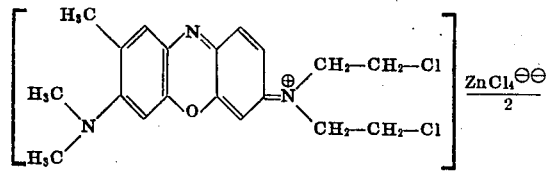

* * * * *